United States Patent [19]

Collonia

[11] 4,301,883
[45] Nov. 24, 1981

[54] DEVICE FOR THE CONTROL OF THE TRAVELING SPEED OF A MOTOR VEHICLE

[75] Inventor: Harald Collonia, Glashütten, Fed. Rep. of Germany

[73] Assignee: VDO Adolf Schindling AG, Frankfurt am Main, Fed. Rep. of Germany

[21] Appl. No.: 924,952

[22] Filed: Jul. 17, 1978

[30] Foreign Application Priority Data

Jul. 21, 1977 [DE] Fed. Rep. of Germany ....... 2732905

[51] Int. Cl.³ .............................................. B60K 31/00
[52] U.S. Cl. .................................. 180/179; 123/352; 123/361
[58] Field of Search ............... 180/105, 179, 178, 171, 180/170; 123/102, 361, 360, 352, 350, 349, 333, 369

[56] References Cited

U.S. PATENT DOCUMENTS

| | | | |
|---|---|---|---|
| 2,192,714 | 3/1940 | Norman et al. | 180/179 X |
| 2,911,077 | 11/1959 | Carter, Jr. | 123/352 X |
| 2,923,156 | 2/1960 | Young | 73/313 |
| 3,630,177 | 12/1971 | Engel | 123/333 |
| 3,648,808 | 3/1972 | Kato | 180/176 X |
| 3,886,915 | 6/1975 | Taplin | 180/179 X |
| 4,026,168 | 5/1977 | Kobayashi | 123/3 W X |
| 4,084,659 | 4/1978 | Abend et al. | 180/179 |
| 4,112,885 | 9/1978 | Iwata et al. | 123/361 X |

Primary Examiner—Joseph F. Peters, Jr.
Assistant Examiner—Milton L. Smith
Attorney, Agent, or Firm—Martin A. Farber

[57] ABSTRACT

A device for the control of the traveling speed of a motor vehicle with a regulating member actuatable by the vehicle driver and giving off an electrical signal, the regulating member being connected with the desired-value input of an electrical controller, the output signal of which acts on an adjustment actuator. The latter is coupled with the element which influences the fuel-air mixture, particularly the throttle valve, and the instantaneous position of the adjustment actuator is transmitted as an electric signal to the actual-value input of the controller. A correction circuit is connected with the actual-value input or the desired-value input of the controller. For the correction of the throttle-valve displacement which is dependent on the regulating member, this circuit produces a signal which is a function of one or more operating parameters which are related to the fuel consumption.

16 Claims, 5 Drawing Figures

DEVICE FOR THE CONTROL OF THE TRAVELING SPEED OF A MOTOR VEHICLE

The invention relates to a device for the control of the traveling speed of a motor vehicle with a regulating means actuatable by the vehicle driver, the regulating means emitting an electrical signal, the regulating means being connected with the desired value input of an electrical controller, the output signal of which acts on a positioning or adjustment actuator, the latter being coupled with the element, particularly the throttle valve, which influences the fuel-air mixture, the instantaneous setting position of the adjustment actuator being transmitted as an electric signal to the actual-value input of the controller.

In a device of this type, the gas pedal is coupled to an electric position indicator or setting transmitter which feeds the desired value input of the controller with an electric signal which is dependent on the instantaneous position of the gas pedal. Another position indicator or setting transmitter is coupled to the throttle valve and connected with the actual-value input of the controller. An adjustment actuator which is controlled by the controller acts on the throttle valve. Such an arrangement has the advantage over the known arrangements in which the gas pedal and the throttle valve are mechanically connected to each other, that the gas pedal is easily movable and that a precisely dosaged fuel-saving actuation is thus possible. If a comparator (both of the inputs of which are supplied with the signal from the position indicator of the gas pedal and a signal which is proportional to the speed of the engine) is connected in front of the desired-value input of the controller, then, for a stationary or fixed position of the gas pedal, the vehicle can travel with constant speed, in which connection, changes in load on the motor such as that which result, for instance, from the character of the road or other factors which influence the speed of the vehicle, do not have to be compensated for by changes in the position of the gas pedal. By such a controlled manner of driving, the consumption of fuel per unit distance travelled can, as has been found, be reduced to a certain extent, as compared with other types of regulation. However, the consumption of fuel per unit distance travelled is still dependent to a considerable extent on the manner of driving effected by the driver, which is undesirable.

The object of the present invention is to improve devices and arrangements of the aforementioned type in such a manner that a further decrease in the consumption of fuel per unit distance travelled can be obtained. In particular, the arrangement should be such that the influence of the manner of driving of the individual driver on the consumption of fuel remains within the narrowest possible limits. Furthermore, these measures are to be attainable at the lowest possible expense.

It is an object of the invention in this respect to provide a device for controlling the speed of a motor vehicle wherein a correction circuit (11, 11') is provided which is connected with the actual-value input or the desired-value input of the controller (1), which circuit produces, for the correction of the throttle-valve displacement, the latter being dependent on the regulating means, a signal which is a function of one or more operating parameters (B), the latter parameters being related to the fuel consumption.

In the case of such a device, therefore, the displacement of the throttle valve effected by the driver by means of the gas pedal is corrected so as to reduce the consumption of fuel, possibly with due consideration of the manner of driving necessary on the basis of the traffic conditions.

In accordance with one embodiment of the invention, a circuit is provided which produces a correction signal which is dependent on the pressure in the intake manifold (FIG. 4). If, with an arrangement having such a circuit, the gas pedal is actuated by the driver, the displacement of the throttle valve produced thereby causes a change in pressure in the intake manifold, which change is measured and converted into a corresponding signal. This signal is fed to the circuit, which produces a correction signal, by means of which the opening of the throttle valve is limited in such a manner that the position of the throttle valve and the speed of rotation of the engine are in a specific relationship to each other, this relationship being established or prescribed by the instantaneous condition of the operation of the engine. In this way, only the minimum amount of fuel which is necessary for the instantaneous condition of operation is fed to the engine at any time, that is, even during acceleration.

In another embodiment of the invention, a circuit is provided which produces a correction signal that is dependent on the speed of rotation of the engine. The function in principle is the same as in the case of the arrangement described above, merely that in this embodiment the conversion of the physical value—pressure in the intake manifold, speed of rotation of the engine—into an electrical signal is simpler to effect. Beyond that if a tachometer or speedometer already exists in the vehicle, as is true in the case of a large number of vehicles, the rotational speed dependent signal which is required for the circuit can be taken from the indicator or transmitter of the tachometer, so that the installation of an additional indicator or transmitter is entirely unnecessary and can be done without. This constitutes a particular advantage of this embodiment.

In accordance with a further concept of the invention, a circuit is provided which produces a correction signal which is a function of the acceleration of the motor vehicle. With such an arrangement the acceleration of the vehicle can be limited, so that a reduction in the consumption of fuel in comparison with the known arrangements can also be obtained.

It may also be advantageous to provide a circuit which produces a correction signal which is a function of the load on the vehicle.

In accordance with a further concept of the invention, a circuit is provided which produces a correction signal which is a function of the remaining quantity of fuel present in the fuel tank (FIG. 5). In this case the circuit, disregarding all other operating parameters such as, for instance, load, acceleration, high speed of travel, etc., controls the engine in such a manner that the greatest possible distance can be travelled with the existing quantity of fuel which still remains.

The various circuits described above, as well as other circuits which produce correction signals as a function of engine temperature, exhaust gas temperature and other operating parameters, can be used both individually and in combination, but with an increase in the number of circuits, the acceleration and maximum speed may drop to such low values that the driving characteristics of the vehicle go down to an unacceptable level.

It has therefore been found advisable to provide switches in order to place the individual circuits in and out of operation, respectively. For this purpose, manually operable switches can be used, or which is particularly advantageous, switches can be provided which operate by themselves when certain predetermined operating values are reached. Such an automatically operating switch will be provided in particular for turning on and turning off, respectively, a circuit that produces a correction signal which is a function of the amount of fuel remaining in the gas tank.

In accordance with one embodiment of the invention, each circuit is formed as a control stage (11, 11'), the output of the latter being connected with the desired-value input of the controller (1), and the desired-value input of the control stage is supplied with the regulating means signal and the actual-value input of the control stage is supplied with the operating parameter signal or signals, respectively. It has been found that it is possible to produce the correction signals at particularly little expense with such a control stage. In particular, the most different operating-parameter/throttle-valve adjustment-angle curves can be thereby produced in simple fashion.

With the above and other objects and advantages in view, the present invention will become more clearly understood in connection with the following detailed description of preferred embodiments, when considered with the accompanying drawings, of which:

Figure 1:
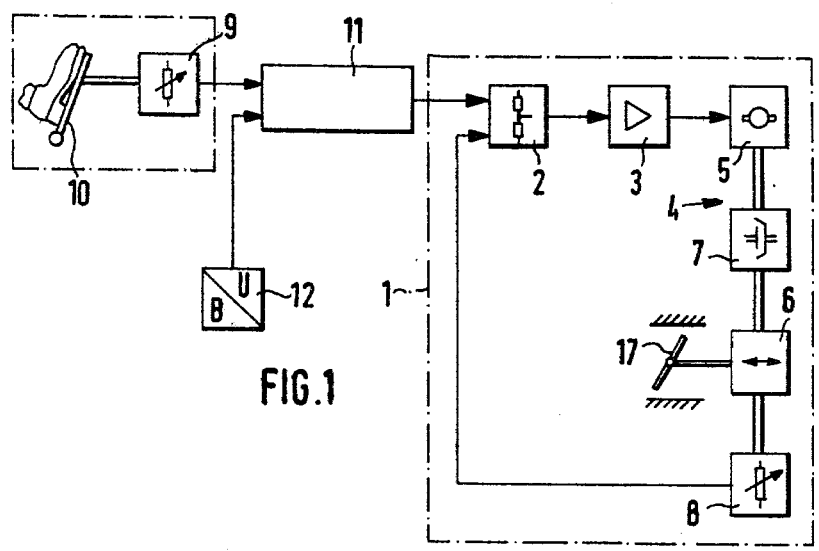
FIG. 1 is a block circuit diagram of a device in accordance with the invention.

The arrangement comprises an electrical controller or regulator 1 which comprises essentially a comparator 2, an amplifier 3 connected following the comparator in series and a setting or adjusting device 4, the latter comprising an electric servomotor 5, a positioning or adjustment actuator 6, and an electromagnetic coupling or clutch 7, the clutch being interposed or operatively connected between the last two mentioned units. The controller 1 furthermore contains a position indicator or setting transmitter 8 which is connected to the positioning or adjustment actuator 6, the position indicator 8 transmitting a voltage which is proportional to the instantaneous position of the position indicator 8 to one of the inputs of the comparator 2. At the other input of the comparator 2 (which comparator for example can be constructed of a series connection of two resistors which are acted on at their free ends by the signals to be compared and the interconnected ends thereof form the comparator output), there is normally located the position indicator 9, the latter being formed as a variable resistor and being coupled to the gas pedal 10 (i.e., the regulating means actuatable by the driver) of the motor vehicle.

With the device in accordance with the invention, however, the position indicator 9 is connected to the desired-value input of a regulating or control stage 11, the output of which is connected to the other input of the comparator 2. A transmitter 12 is connected to the actual-value input of the regulator or controller 11. The transmitter 12 is associated with or coordinated to an operating parameter and transmits a voltage signal which is a function of the operating parameter.

Figure 2:
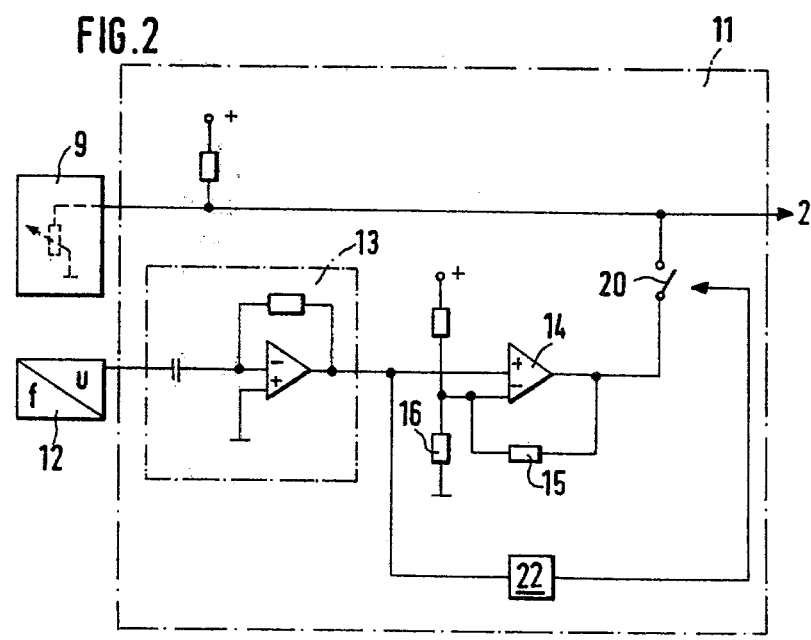
FIG. 2 is a circuit diagram of a control or regulating stage, which circuit diagram has been simplified for the present purpose.

With a regulating or control stage which emits a correction signal which is a function of the acceleration of the motor vehicle (such a regulating stage 11 is shown in FIG. 2), the transmitter 12 can be a tachogenerator which gives off a voltage signal which is a function of the speed of travel of the motor vehicle. This signal is then differentiated in a differentiator stage 13 of the regulator 11 so that a voltage signal which is a function of the instantaneous acceleration is available at the differentiating stage 13. The positive input of the differential amplifier 14 is then acted on by this voltage signal. The output of the differential amplifier 14, on the one hand, is connected to the desired-value input of the controller 1, while, on the other hand, it is fed back via a resistor 15 to the negative input of the operational amplifier 14. The negative input of the operational amplifier 14 is furthermore connected to a voltage divider 16. Furthermore, the desired-value input of the controller 1 is connected to the position indicator 9.

In order to explain the manner of operation of the device, let us assume that the gas pedal 10 is in its position of rest and the motor is rotating at idling speed. The throttle valve 17 is then in its idling position and both inputs of the comparator 2 are supplied with signals which correspond to the prevailing equilibrium. If the gas pedal 10 is now pivoted to a certain angle by the driver, the position indicator 9 gives off a higher voltage signal to the comparator 2 and the comparator 2 drives the servomotor 5. The latter via the positioning or adjustment actuator 6 pivots the throttle valve 17 in such a direction as to increase the speed of the rotation of the motor. The change in position of the positioning or adjustment actuator 6 results in a change in the output signal of the position indicator 8, as a result of which the voltage at the other input of the comparator 2 increases.

As a result of the change in rotational speed of the engine, simultaneously there also takes place an increase in the speed of travel of the vehicle. This results in an increase in the output signal at the differentiating stage 13. If the amplitude of the output signal of the differentiating stage 13 remains below a given predetermined value, the output signal of the position indicator 9 is not corrected. In other cases however, if the amplitude is not below the given predetermined value, for instance, in the case of too large an acceleration, the potential at the desired-value input of the controller 1 is reduced by the differential amplifier 14 by such an amount that the throttle valve 17 is swung into a position which corresponds to the exactly prevailing acceleration value that exists at the time. If there is no change in position of the position indicator 9, the vehicle accelerates with an acceleration which is limited by the control stage 11 until the controller 1 is in its condition of equilibrium.

Figure 3:
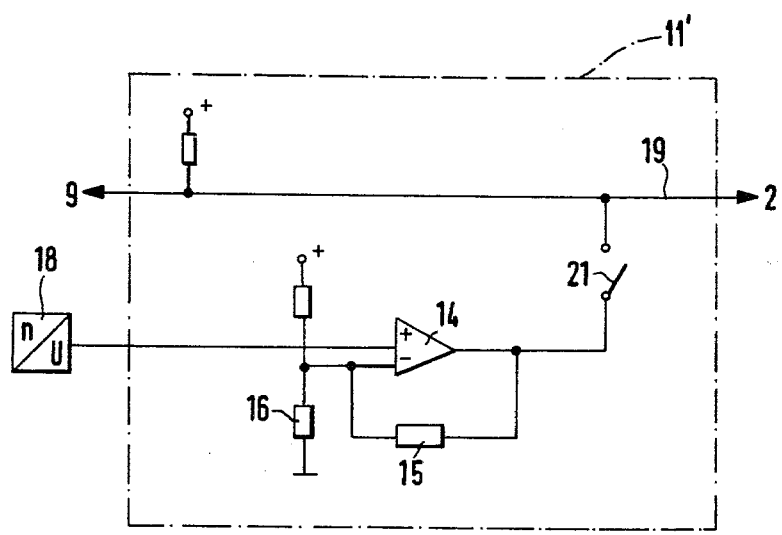
FIG. 3 is a circuit diagram of another control stage, which circuit diagram has also been simplified for the present purposes.

With the control stage 11' shown in FIG. 3, a correction signal is produced which is a function of the rotation speed (RPM) of the engine. The control stage 11' is constructed in substantially the same manner as the control stage 11, but it lacks the differentiating stage 13, and the differential amplifier 14 is driven directly by a tachometer 18. In this arrangement, if the potential on the line 19 increases as a result of actuation of the gas pedal over a value associated with the instantaneous rotational speed of the engine, then the potential is reduced by the differential amplifier 14 to the value associated with this rotational speed value. This means, for instance, that upon acceleration, the throttle valve 17, in all cases opens only each time to the extent which is just precisely necessary for the rotational speed existing at that time, and the vehicle therefore is optimally accelerated with the smallest possible consumption of fuel.

For placing the control stages 11 and 11' in and out of operation, switches 20 and 21, respectively, can be provided, the switch 20 in the regulating stage 11 being constructed such that when a given value of acceleration is exceeded, the control or regulating stage 11 is turned on. For this purpose, the switch 20 is controlled or triggered via a threshold-value switch 22, the latter being connected to the output of the differentiator stage 13. The switch 21 which is contained in the control stage 11' is manually actuatable.

Figure 4:
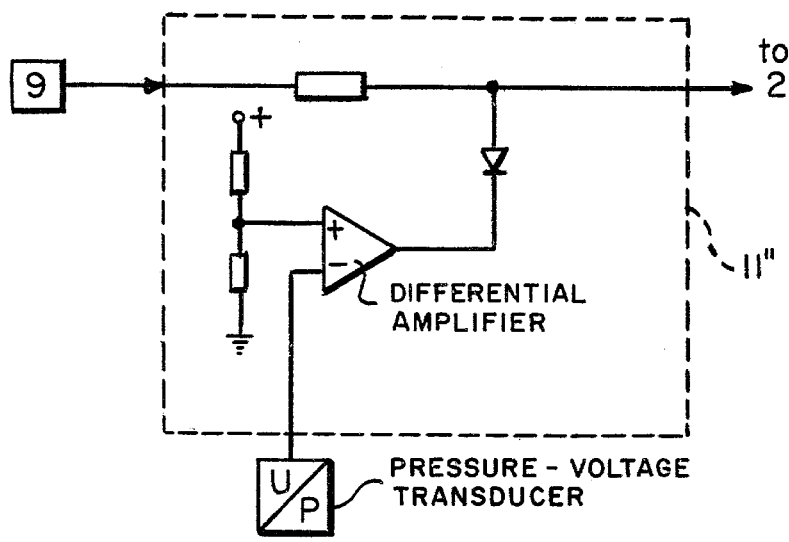
FIG. 4 is a circuit diagram of another control stage also in simplified form.

The control stage 11'' of FIG. 4 can be used to produce a correction signal which is a function of the pressure in the intake manifold of the motor vehicle.

Figure 5:
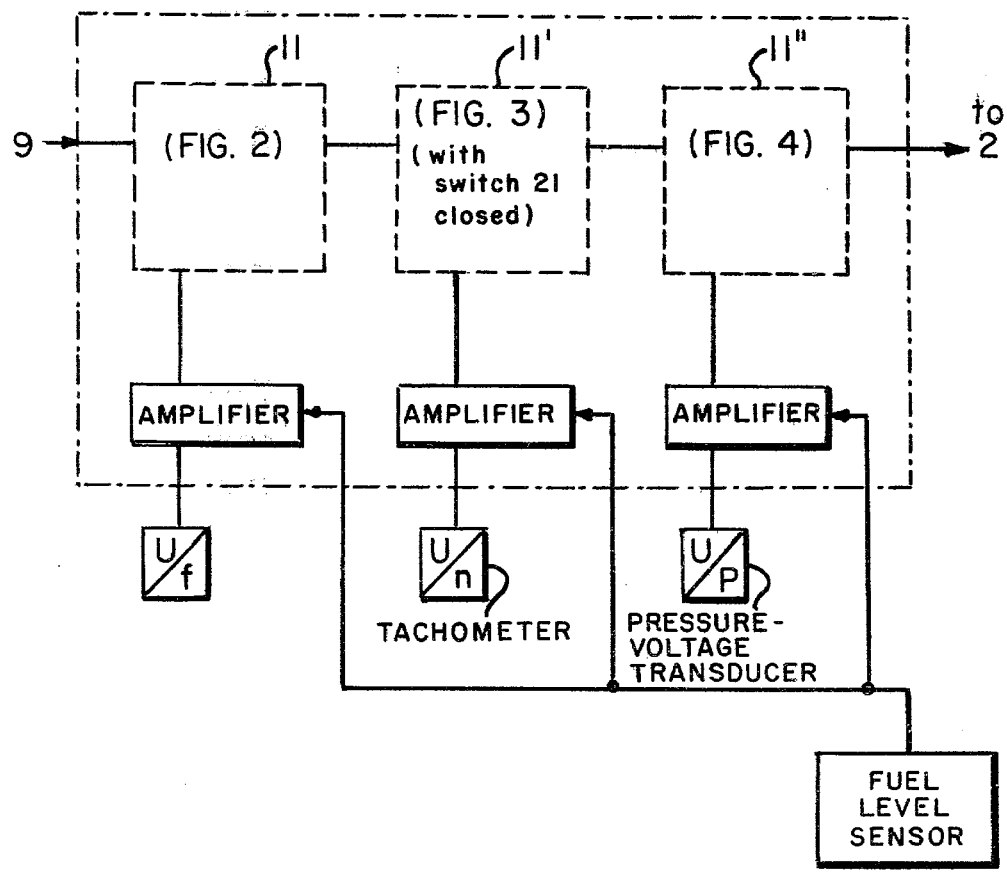
FIG. 5 is a circuit diagram of still another control stage in simplified form.

The control stage of FIG. 5 can be used to produce a correction signal which is a function of the amount of fuel remaining in the fuel tank of the motor vehicle.

I claim:

1. A device for the control of the speed of travel of a motor vehicle by controlling the element which controls the fuel-air mixture, particularly the throttle valve and having a gas pedal which is actuatable by the driver, comprising
   transmitter means coupled with the gas pedal and transmitting an electric signal dependent on the position of the gas pedal,
   means for effecting a gas pedal dependent adjustment of said throttle valve in dependency on the position of the gas pedal corresponding to from zero vehicle speed to a maximum vehicle speed, said means comprising an electrical controller having an electrical desired-value input operatively connected with said transmitter means and an electrical actual-value input, said electrical controller including an adjustment actuator coupled with the throttle valve, and means for transmitting the instantaneous position of the adjustment actuator as an electrical signal to said actual-value input,
   circuit means operatively connected with one of said inputs of said electrical controller for producing a correction signal for superimposing correction of a continuing operative said gas pedal dependent adjustment of the throttle valve so as to decrease fuel consumption substantially independently of the extent of stepping-down on the gas pedal by the driver, said correction signal being dependent on at least one instantaneous operating parameter of the vehicle which is dependent on consumption of fuel.

2. The device according to claim 1, wherein
   said circuit means constitutes a control stage having an output connected to said desired-value input of said controller,
   said control stage having a control stage desired-value input connected to the gas pedal and receiving a signal therefrom,
   said control stage having a control stage actual-value input means for receiving one signal of said at least one operating parameter.

3. The device according to claim 1, wherein said circuit means produces a correction signal which is a function of the pressure in the intake manifold of the motor vehicle.

4. The device according to claim 1, wherein said circuit means produces a correction signal which is a function of the load of the motor vehicle.

5. The device according to claim 1, wherein
   said circuit means produces a correction signal which is function of the amount of fuel remaining in the fuel tank of the motor vehicle.

6. The device according to claim 1, further comprising
   switch means for turning on and turning off, respectively, said circuit means.

7. The device respectively, according to claim 6, wherein said switch means constitutes manually adjustable actuatable switches.

8. The device according to claim 6, further including switching means for switching said switch means when certain predetermined operating values are reached.

9. The device according to claim 1, wherein
   said circuit means for providing said correction signal for correction of the adjustment of the throttle valve such that the latter swings into a position corresponding to the instantaneous condition of said operating parameter.

10. The device according to claim 1, wherein
    said transmitter means and said electrical controller are operative whenever said gas pedal is depressed or in idling position without any switch therefor whenever the motor vehicle is in an operative condition.

11. A device for the control of the speed of travel of a motor vehicle by controlling the element which controls the fuel-air mixture, particularly the throttle valve and having a gas pedal which is actuatable by the driver, comprising
    transmitter means coupled with the gas pedal and transmitting an electric signal dependent on the position of the gas pedal,
    means for effecting a gas pedal dependent adjustment of said throttle valve in dependency on the position of the gas pedal corresponding to from zero vehicle speed to a maximum vehicle speed, said means comprising an electrical controller having an electrical desired-value input operatively connected with said transmitter means and an electrical actual-value input, said electrical controller including an adjustment actuator coupled with the throttle valve, and means for transmitting the instantaneous position of the adjustment actuator as an electrical signal to said actual-value input,
    circuit means operatively connected with one of said inputs of said electrical controller for producing a correction signal for correction of said gas pedal dependent adjustment of the throttle valve so as to decrease fuel consumption substantially independently of the extent of stepping-down on the gas pedal by the driver, said correction signal being dependent on at least one instantaneous operating parameter of the vehicle, said operating parameter being dependent on consumption of fuel,
    tachometer means for providing a signal dependent on the instantaneous rotational speed of the vehicle,
    said circuit means comprises,
    a line directly connected from said transmitter means to said desired value input of said controller, a differential amplifier having an output directly connected to said line and a first input directly connected to said tachometer means and a second input operatively connected to said output, a voltage divider connected directly to said second input of said differential amplifier, whereby when potential on said line via said transmitter means increases above a value associated with the instantaneous rotational speed, the potential is reduced via said output of said differential amplifier to the value associated with said instantaneous rotational speed, whereby upon acceleration the throttle valve opens only to an extent precisely necessary for said instantaneous rotational speed and the vehicle is optimally accelerated with a smallest possible consumption of fuel.

12. The device according to claim 11, wherein said circuit means produces a correction signal which is a function of the speed of rotation of the engine of the motor vehicle.

13. The device according to claim 11, further comprising an on-off switch disposed connected in said output of said differential amplifier leading to said line.

14. A device for the control of the speed of travel of a motor vehicle by controlling the element which controls the fuel-air mixture, particularly the throttle valve and having a gas pedal which is actuatable by the driver, comprising transmitter means coupled with the gas pedal and transmitting an electric signal dependent on the position of the gas pedal, means for effecting a gas pedal dependent adjustment of said throttle valve in dependency on the position of the gas pedal corresponding to from zero vehicle speed to a maximum vehicle speed, said means comprising an electrical controller having an electrical desired-value input operatively connected with said transmitter means and an electrical actual-value input, said electrical controller including an adjustment actuator coupled with the throttle valve, and means for transmitting the instantaneous position of the adjustment actuator as an electrical signal to said actual-value input, circuit means operatively connected with one of said inputs of said electrical controller for producing a correction signal for correction of said gas pedal dependent adjustment of the throttle valve so as to decrease fuel consumption substantially independently of the extent of stepping-down on the gas pedal by the driver, said correction signal being dependent on at least one instantaneous operating parameter of the vehicle, said operating parameter being dependent on consumption of fuel, tachometer means for providing a signal dependent on the instantaneous rotational speed of the vehicle, said circuit means comprises, a line directly connected from said transmitter means to said desired value input of said controller, a differential amplifier having an output directly connected to said line and a first input and a second input operatively connected to said output, a voltage divider connected directly to said second input of said differential amplifier, a differentiator having an input connected to said tachometer means, and an output providing an output signal representing the exactly prevailing acceleration value of the vehicle connected to said first input of said differential amplifier, being rated such that when the amplitude of said output signal remains below a predetermined value, potential on said line is not corrected via the output of said differential amplifier, and when corresponding to larger than a predetermined acceleration movement of the gas pedal the amplitude of said output signal is above said predetermined value, the potential in said line is reduced via said differential amplifier by an amount such that the throttle valve is swung into a position which corresponds to the exactly prevailing acceleration value, whereby the acceleration of the vehicle is limited such that a minimum amount of fuel which is necessary for the prevailing acceleration is fed to the engine.

15. The device according to claim 14, wherein said circuit means produces a correction signal which is a function of the acceleration of the motor vehicle.

16. The device according to claim 14, further comprising an on-off switch disposed in said output of said differential amplifier leading to said line, a threshold-value switch means connected to said on-off switch and to said output of said differentiator for opening said switch when a predetermined value of acceleration of the vehicle is present in said output of said differentiator.

* * * * *